United States Patent [19]

Grace et al.

[11] Patent Number: 4,522,976

[45] Date of Patent: Jun. 11, 1985

[54] GRAFT POLYMER DISPERSION IN A MIXTURE OF LOW MOLECULAR WEIGHT POLYOLS AND POLYETHER POLYOLS AND POLYURETHANE FOAMS PREPARED THEREFROM

[75] Inventors: Oscar M. Grace, Madison Heights, Mich.; Steven E. Wujcik, Long Beach, Calif.; Duane A. Heyman, Monroe, Mich.

[73] Assignee: BASF Wyandotte Corporation, Wyandotte, Mich.

[21] Appl. No.: 611,134

[22] Filed: May 17, 1984

[51] Int. Cl.$^3$ .............................................. C08L 25/08
[52] U.S. Cl. .................................... 524/722; 524/724; 524/742; 524/762; 524/775; 525/11; 525/23; 525/34; 525/42; 525/43; 525/404; 525/455
[58] Field of Search ............... 524/722, 724, 742, 762, 524/775; 525/11, 23, 34, 42, 43, 404, 455

[56] References Cited

U.S. PATENT DOCUMENTS

Re. 28,715  2/1976  Stamberger .................... 526/11.1
Re. 29,014 10/1976  Pizzini et al. ................... 526/11.1
3,931,092  1/1976  Ramlow et al. ................. 526/11.1

Primary Examiner—Maurice J. Welsh
Attorney, Agent, or Firm—Norbert M. Lisicki

[57] ABSTRACT

A low viscosity, stable graft polymer dispersion is prepared by polymerizing in the presence of a free radical initiator, from about 25 to about 70 weight percent based on the total weight of the dispersion, an ethylenically unsaturated monomer or mixture of monomers, in a polyol mixture comprising (1) from about 25 to about 99 weight percent of a polyol containing from 2 to 8 hydroxyl groups and having an equivalent weight from 30 to about 200, (2) from about 1 to about 75 weight percent of a macromer containing induced unsaturation, said macromer comprising the reaction product of a polyether polyol having an equivalent weight from 100 to 10,000 with a compound having both ethylenic unsaturation and a group selected from the group consisting of a hydroxyl, carboxyl, anhydride, isocyanate and epoxy or mixtures thereof. These graft polymer dispersions are useful for preparing polyurethane products.

16 Claims, No Drawings

GRAFT POLYMER DISPERSION IN A MIXTURE OF LOW MOLECULAR WEIGHT POLYOLS AND POLYETHER POLYOLS AND POLYURETHANE FOAMS PREPARED THEREFROM

BACKGROUND OF THE INVENTION

1. Field of the Invention

The present invention relates to low viscosity graft polymer dispersions in a mixture of polyols. More particularly, the invention relates to graft polymer dispersions prepared by the free radical polymerization of an ethylenically unsaturated monomer or mixture of monomers in a polyol mixture comprising (1) from about 25 to about 99 weight percent of a polyol containing from 2 to 8 hydroxyl groups and an equivalent weight from 30 to about 200 (2) from about 1 to about 75 weight percent of a macromer containing induced unsaturation, the macromer being the reaction product of a polyether polyol and a compound having both ethylene unsaturation and a group selected from the group consisting of a hydroxyl, carboxyl, anhydride, isocyanate and epoxy group.

2. Description of the Prior Art

The prior art, as evidenced by U.S. Pat. Nos. 3,652,658; 3,875,258; 3,950,317, and U.S. Pat. Nos. Re. 28,715 and 29,014 teaches the preparation of graft polymer dispersions which are useful in the preparation of polyurethanes by the polymerization of ethylenically unsaturated monomers in polyols. The above patents disclose various methods of preparing graft polymer dispersions. U.S. Pat. No. 3,931,092 teaches the preparation of polymeric solids by carrying out the polymerization in the presence of a free-radical initiator and an organic solvent. The solvent concentration employed is from about 1 part to 19 parts by weight per part of the hydroxy-terminated organic compound which has a polymerizable carbon double bond. U.S. Pat. No. 3,953,393 teaches the preparation of graft polymer dispersions by employing alkylmercaptan chain transfer agents at concentrations from 0.1 to 2 percent by weight based on the weight of vinyl monomer.

Stable dispersions of polymers in polyols have found broad commercial use in the preparation of polyurethanes. The use of these dispersions, known in the trade as graft or polymer polyols, improves processing and, among other properties, the firmness of the polyurethane products, often expressed as load bearing or modulus. There have been many attempts to improve the products representing the present state of the art. Efforts have been directed towards increasing the amount of polymer which is dispersed in the polyol, the obvious benefit being that firmer polyurethanes can be produced.

The prior art has not taught that in situ free radical polymerizations may be conducted in a polyol mixture comprising (1) from about 25 to about 99 weight percent of a polyol containing from 2 to 8 hydroxyl groups and an equivalent weight from 30 to about 200 and (2) from about 1 to about 75 weight percent of a macromer containing induced unsaturation, the macromer being the reaction product of a polyether polyol and a compound having both ethylene unsaturation and a group selected from the group consisting of a hydroxyl, carboxyl, anhydride, isocyanate and epoxy group.

SUMMARY OF THE INVENTION

It has been discovered that high-resiliency polyurethane foams may be prepared by employing the graft polymer dispersions of the present invention. These dispersions are prepared by a process employing free radical polymerization of an ethylenically unsaturated monomer or monomers in a mixture containing a polyol and a macromer, as defined later, containing induced unsaturation wherein the mixture has a level of unsaturation of from about 0.001 mole to about 1.0 per mole of mixture.

DESCRIPTION OF THE PREFERRED EMBODIMENTS

In accordance with the subject invention, a low viscosity, stable graft polymer dispersion is prepared by polymerizing in the presence of a free radical initiator, from about 25 to about 70 weight percent based on the total weight of the dispersion, an ethylenically unsaturated monomer or mixture of monomers, in a polyol mixture comprising (1) from about 25 to about 99 weight percent of a polyol containing from 2 to 8 hydroxyl groups and having an equivalent weight from 30 to about 200, (2) from about 1 to about 75 weight percent of a macromer containing induced unsaturation; said macromer comprising the reaction product of a polyether polyol having an equivalent weight from 100 to 10,000 with a compound having both ethylenic unsaturation and a group selected from the group consisting of a hydroxyl, carboxyl, anhydride, isocyanate and epoxy or mixtures thereof.

The polyols which are contemplated in the practice of this invention contain from 2 to 8 hydroxyl groups and have an equivalent weight ranging from about 30 to about 200. These include ethylene glycol, diethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol and sucrose. Also included within the term polyol are compounds derived from phenol such as 2,2-bis(4-hydroxyphenyl)propane, commonly known as Bisphenol A.

Also included are the halogenated glycols such as mono-, di-, and trichloro-ethylene glycol, propylene glycol, diethylene glycol and dipropylene glycol and other halogenated glycols. In the event that the normally solid polyhydric compounds are not liquid at the reaction temperatures which are contemplated, mixtures of the above may be employed.

As mentioned above, the polyol comprises from about 25 to about 99 weight percent of the polyol mixture comprising the polyol and the macromer.

Representative polyols essentially free from ethylenic unsaturation which may be employed in the preparation of the macromers of the invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459, 3,190,927, and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000 preferably from 1000 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric compound. Any suitable alkylene oxide may be used such as ethylene oxide, propylene oxide, butylene oxide, amylene oxide, and mixtures of these oxides. The polyoxyalkylene polyether polyols may be prepared from other starting materials which as tetrahydrofuran and alkylene oxidetetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology,* Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols or macromers which are employed in the present invention may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, isocyanate or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxyl ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employemtn in the present invention. The amount of alkylene oxide employed is such as to reduce the acid number of the unsaturated polyol to about 5 or less.

The alkylene oxides which may be employed for the preparation of the polyetherester polyols include ethylene oxide, propylene oxide, butylene oxide, amylene oxide and mixtures of these oxides, preferably ethylene and propylene oxide.

Chain transfer agents may be employed as reaction moderators and more particularly at temperatures below 105° C. The polymerization reaction may be carried out at temperatures between 25° C. and 180° C., preferably between 80° C. and 135° C. The mixture contains from about 0.001 to 1.0 mole of unsaturation per mole of mixture.

The chain transfer agents employed will depend on the particular monomers or mixtures of monomers employed and the molar ratios of such mixtures. The concentration of the chain transfer agent employed is that amount which is effective and may range from 0.1 to 10 percent by weight based on the weight of monomer, preferably from 0.5 to 2.0 weight percent based on the weight of monomer.

Among those chain transfer agents which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1-naphthol, 2-naphthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 3-phosphinopropionitrile, 1-propanol, pyrocatechol, pyrogallol, methyl stearate, tetraethylsilane, triethylsilane, dibromostilbene, α-bromostyrene, α-methylstyrene, tetraphenyl succinonitrile, 2,4,6-trinitrotoluene, p-toluidine, N,N-dimethyl-p-toluidine, α-cyano-p-tolunitrile, α,α'-dibromo-p-xylene, 2,6-xylenol, diethyl zinc, dithiodiacetic acid, ethyl dithiodiacetic acid, 4,4'-dithiobisanthranilic acid, benzenethiol, o-ethoxybenzenethiol, 2,2'-dithiobisbenzothiazole, benzyl sulfide, 1-dodecanethiol, ethanethiol, 1-hexanethiol, 1-naphthalenethiol, 2-naphthalenethiol, 1-octanethiol, 1-heptanethiol, 2-octanethiol, 1-tetradecanethiol, α-toluenethiol, isopropanol, 2-butanol, toluene, bromochloromethane, 1-butanol, carbon tetrachloride, 2-mercaptoethanol, octadecyl mercaptan, carbon tetrabromide and tertiary dodecyl mercaptan.

When the macromer is prepared employing either maleic acid and/or maleic anhydride, the maleated macromer is isomerized at temperatures ranging from 80° C. to 120° C. for one-half hour to three hours in the presence of an effective amount of an isomerization catalyst. The catalyst is employed at concentrations greater than 0.01 weight percent based on the weight of the macromer and may be as high as 5.0 weight percent.

The maleate containing polyetherester polyol may be prepared employing the catalyst selected from the group consisting of salts and oxides of divalent metals, the concentration of catalyst which may be employed ranges from 0.01 to 0.5 weight percent based on the weight of polyol mixture. The temperatures employed range from 75° C. to 175° C. The equivalent weight of the polyol employed to prepare the macromer may vary from 1000 to 10,000 preferably from 2000 to 6000.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate.

Certain of the above-mentioned catalysts such as calcium naphthenate promote the isomerization of the maleate to the fumarate structure during the preparation of the macromer.

The macromer unsaturation ranges from 0.1 mole to 1.5 mole of unsaturation per mole of polyol and, preferably, from 0.5 to 1.0 mole of unsaturation per mole of polyol.

As mentioned above, the graft polymer dispersions of the invention are prepared by the in situ polymerization, in the above-described mixtures of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, norbornadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, n-vinyl carbazole, vinyl ethyl sulfone, N-methyl-N-vinyl acetamide, N-vinylpyrrolidone, vinyl imidazole, divinyl benzene, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters if itaconic acid, vinyl pyridine, and the like. Any of the known polymerizable monomers can be used and the compounds listed above are illustrative and not restrictive of the monomers suitable for use in this invention. Preferably, the monomers are acrylonitrile and styrene.

The amount of ethylenically unsaturated monomer employed in the polymerization reaction is generally from about 25 percent to about 70 percent, preferably from 30 percent to 50 percent, based on the total weight of the dispersion. The polymerization occurs at a temperature between about 25° C. and 180° C., preferably from 80° C. to 135° C.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-$\alpha$-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, $\alpha$-methylbenzyl hydroperoxide, $\alpha$-methyl-$\alpha$-ethyl benzyl hydroperoxide, tetralin hydroperoxide, triphenylmethyl hydroperoxide, diphenylmethyl hydroperoxide, $\alpha,\alpha'$-azobis-2-methyl heptonitrile), 1,1'-azo-bis(cyclohexane carbonitrile), 4,4'-azobis(4-cyanopentanoic acid), 2,2'-azobis-(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane,2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2-t-butylazo-2-cyano-4-methylpentane, 2-t-butylazo-2-isobutyronitrile, to butylperoxyisopropyl carbonate and the like; a mixture of initiators may also be used. The preferred initiators are 2,2'-azobis(2-methylbutanenitrile), 2,2'-azobis-(isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, and 2-t-butylazo-2-cyanobutane. Generally, from about 0.01 percent to about 5 percent, preferably from about 0.5 percent to about 1.5 percent, by weight of initiator based on the weight of the monomer will be employed in the process of the invention.

The graft polymer dispersions of this invention have useful viscosities of less than 10,000 cps at 25° C. Preferably they have viscosities ranging from 500 to 2000 cps at 25° C.

The polyurethane foams employed in the present invention are generally prepared by the reaction of a graft polymer dispersion with an organic polyisocyanate in the presence of a blowing agent and optionally in the presence of additional polyhydroxyl-containing components, chainextending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

The graft polymer dispersions may also be employed in the preparation of polyurethane elastomers.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, abd toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

The graft polymer dispersions may be employed along with another polyhydroxyl-containing component commonly employed in the art. Any of the polyhydroxyl-containing components which are described above for use in the preparation of the macromers may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

If desired, flame retardants may be incorporated in the foams. Among the flame retardants which may be employed are: pentabromodiphenyl oxide, dibromopropanol, tris($\beta$-chloropropyl)phosphate, 2,2-bis(bromoethyl) 1,3-propanediol, tetrakis(2-chloroethyl)ethylene diphosphate, tris(2,3-dibromopropyl)phosphate, tris($\beta$-chloroethyl)phosphate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane and dibromoethyl-dibromocyclohexane. The concentrations of flame retardant compounds which may be employed range from 1 to 25 parts per 100 parts of polyol mixture.

The following examples illustrate the nature of the invention. All parts are by weight unless otherwise stated. In the examples, the physical properties of the polyurethane foam were determined by the following ASTM tests:

Density—D1622-63
Compression Load—D1564

The following abbreviations are employed in the examples below:

Polyol A is an adduct of trimethylolpropane with ethylene oxide and propylene oxide having a hydroxyl number of 24 and an ethylene oxide content of 75 percent.
Catalyst A is Calcium naphthenate.
Initiator A is 2,2'-azobis(2-methylbutyronitrile).
Polyol B is an adduct of glycerine with ethylene oxide and propylene oxide having a hydroxyl number of 50 and an ethylene oxide content of 12.5 percent.
B-2370 is a silicone surfactant manufactured by Goldsmith Inc.
DMEA is dimethylethanolamine.
T-10 is an organo tin catalyst manufactured by M&T Chemicals, Inc.
TDI is toluene diisocyanate.

EXAMPLE 1

Charges:
The following charges were employed in Example 1.

| 1764.5 parts | Polyol A |
|---|---|
| 30.7 parts | maleic anhydride |
| 88 parts | Catalyst A |
| 111.2 parts | propylene oxide |

A suitable reactor equipped with a stirrer, thermometer and gas inlet was charged with polyol A, maleic anhydride and catalyst A. The contents were heated to 125° C. and allowed to react for 1 hour. This intermediate was transferred to a steam heated stainless steel autoclave. After heating to 135° C. and evacuating the reactor to 100 mm Hg pressure, propylene oxide was added during 1¼ hours and the mixture was reacted for 8 hours. The product was isolated after discharging by stripping the volatiles at 105° C. for 1 hour at <10 mm Hg. This product is designated as Macromer A. The unsaturation level was 0.2 as fumarate unsaturation.

EXAMPLE 2

Charges:

| | To reactor: | |
|---|---|---|
| | 60 parts | Macromer A |
| | 840 parts | Propylene glycol |
| Stream #1: | 400 parts | acrylonitrile |
| | 800 parts | styrene |
| | 12 parts | 1-dodecanethiol |
| Stream #2: | 900 parts | propylene glycol |
| | 7.5 parts | initiator A |

Reaction Conditions: reaction temperature, 125° C.; Stream #1 addition time, 230 minutes; Stream #2 addition time, 240 minutes; reaction time, 30 minutes.

The reactor charges were added to a suitable reactor fitted with a stirrer, nitrogen inlet, addition tube, water condenser and thermowell. After heating the glycol reaction mixture to 124° C. and holding for 30 minutes under nitrogen, streams #1 and #2 were added through a Kenics static mixer over the specified time period. Upon completion of stream #1 addition, the reaction mixture was reacted for the specified time. After the reaction period was completed, the reaction mixture was vacuum stripped for 30 minutes at 80° C. and 10 mm Hg. The product from this procedure is designated as Dispersion A. The Brookfield Viscosity of this product at 25° C. was 372 cps.

EXAMPLE 3

Charges:

| To reactor: | 12 parts | macromer A |
| --- | --- | --- |
|  | 160 parts | dipropylene glycol |
| Stream #1: | 80 parts | acrylonitrile |
|  | 160 parts | styrene |
|  | 2.4 parts | 1-dodecanethiol |
| Stream #2: | 180 parts | dipropylene glycol |
|  | 1.5 parts | initiator A |

Reaction Conditions: reaction temperature, 125° C.; Stream #1 addition time, 230 minutes; Stream #2 addition time, 240 minutes; reaction time, 30 minutes.

The reactor charges were added under a nitrogen atmosphere to a reactor. After heating the reactor charge to 125° C. and holding for 30 minutes, streams #1 and #2 were added through a Kenics static mixer over the specified time period. Upon completion of stream #1 addition, the reaction mixture was reacted for the specified time. After the reaction period was completed, the reaction mixture was vacuum stripped for one-half hour at 86° C. and 2 mm Hg. The Brookfield Viscosity of this product at 25° was 1910 cps.

EXAMPLE 4

Example 4 was prepared in a manner similar to Example 3 employing the following components and concentrations:

| To reactor: | 12 parts | Macromer A |
| --- | --- | --- |
|  | 12 parts | butanol |
|  | 168 parts | ethylene glycol |
| Stream #1: | 160 parts | acrylonitrile |
|  | 80 parts | styrene |
|  | 2.4 parts | 1-dodecanethiol |
| Stream #2: | 180 parts | ethylene glycol |
|  | 1.5 parts | initiator A |

The resulting dispersion had a Brookfield Viscosity at 25° of 5720 cps.

EXAMPLE 5

Example 5 was prepared in a manner similar to Example 3 employing the following components and concentrations:

| To reactor: | 15 parts | Macromer A |
| --- | --- | --- |
|  | 135 parts | propylene glycol |
| Stream #1: | 100 parts | acrylonitrile |
|  | 200 parts | styrene |
| Stream #2: | 150 parts | propylene glycol |
|  | 2.0 parts | initiator A |

The resulting dispersion had a Brookfield Viscosity at 25° C. of 1200 cps.

EXAMPLES 6-7

The polyurethane foams of Table I were prepared by charging a one quart cylindrical container with a suitable quantity of the reactants as tabulated. The mixture was stirred for about 30 seconds, allowed to set for about 15 seconds and then stirring was resumed. After about 60 seconds elapsed time, the polyisocyanate was added to the container, and the resulting mixture was stirred for about 4 to 5 seconds. The content of the container was then immediately poured into a cardboard cake box, and the foam was allowed to rise therein. After the foam rise was completed, the resulting foam was oven cured for about 15 minutes.

TABLE I

| | Examples 6-7 | |
| --- | --- | --- |
| Example | 6 | 7 |
| Formulation, pbw | | |
| Dispersion A | — | 10 |
| Polyol B | 200 | 190 |
| Water | 5.0 | 5.0 |
| B-2370 | 1.6 | 1.6 |
| DMEA | 1.2 | 1.2 |
| T-10 | 0.6 | 0.6 |
| TDI (108 INDEX) | 56.5 | 68.4 |
| Foam Properties | | |
| Density, pcf | 2.66 | 2.47 |
| Airflow, cfm | 2.50 | 0.15 |
| Resilience, % | 52 | 16 |
| CLD, % of original | | |
| 25% | 0.54 | 0.17 |
| 50% | 0.71 | 0.27 |
| 65% | 1.06 | 0.43 |

Table I sets forth the ingredients and amounts thereof used to prepare the foams as well as some of the physical properties of the foams.

These results indicate that soft resilient foams suitable for use as packaging materials may be prepared employing minor amounts of the polymer dispersions of the instant invention.

The embodiments of the invention in which an exclusive privilege or property is claimed are defined as follows:

1. A stable low viscosity graft polymer dispersion prepared by polymerizing in the presence of a free radical initiator from about 25 to about 70 weight percent based on the total weight of the dispersion, an ethylenically unsaturated monomer or mixture of monomers, in a polyol mixture comprising (1) from about 25 to about 99 weight percent of a polyol containing from 2 to 8 hydroxyl groups and having an equivalent weight from 30 to about 200, and (2) from about 1 to about 75 weight percent of a macromer containing induced unsaturation, said macromer comprising the reaction product of a polyether polyol having an equivalent weight from 100 to 10,000 with a compound having both ethylenic unsaturation and a group selected from the group consisting of a hydroxyl, carboxyl, anhydride, isocyanate, and epoxy group or mixtures thereof.

2. The graft polymer dispersion of claim 1 wherein the amount of induced saturation is from about 0.001 to about 1.0 mole of unsaturation per mole of polyol mixture.

3. The graft polymer dispersion of claim 1 wherein the monomer is selected from the group consisting of styrene, methylstyrene, vinyl toluene, methyl methacrylate, methacrylonitrile, divinylbenzene and acrylonitrile.

4. The graft polymer dispersion of claim 1 wherein the monomer is selected from the group consisting of styrene and acrylonitrile.

5. The polymer dispersion of claim 1 wherein the monomer is styrene.

6. The polymer dispersion of claim 1 wherein the polymerization occurs in the presence of a chain transfer agent.

7. The polymer dispersion of claim 6 wherein the chain transfer agent is selected from the group consisting of dodecanethiol, bromotrichloromethane, 2- butanol, 1-butanol, allyl alcohol, 2-mercaptoethanol and octadecyl mercaptan.

8. The polymer dispersion of claim 6 wherein the concentration of chain transfer agent is from about 0.1 weight percent to about 10 weight percent based on the weight of the monomer.

9. A process for the preparation of a stable low viscosity graft polymer dispersion prepared by polymerizing in the presence of a free radical initiator from about 25 to about 70 weight percent based on the total weight of the dispersion, an ethylenically unsaturated monomer or mixture of monomers, in a polyol mixture comprising (1) from about 25 to about 99 weight percent of a polyol containing from 2 to 8 hydroxyl groups and having an equivalent weight from 30 to about 200, (2) from about 1 to about 75 weight percent of a macromer containing induced unsaturation, said macromer comprising the reaction product of a polyether polyol having an equivalent weight from 100 to 10,000 with a compound having both ethylenic unsaturation and a group selected from the group consisting of a hydroxyl, carboxyl, anhydride, isocyanate, and epoxy group or mixtures thereof.

10. The process of claim 9 wherein the amount of induced saturation is from about 0.001 to about 1.0 mole of unsaturation per mole of polyol mixture.

11. The process of claim 9 wherein the monomer is selected from the group consisting of styrene, methylstyrene, vinyl toluene, methyl methacrylate, methacrylonitrile, divinylbenzene and acrylonitrile.

12. The process of claim 9 wherein the monomer is selected from the group consisting of styrene and acrylonitrile.

13. The process of claim 9 wherein the monomer is styrene.

14. The process of claim 9 wherein the polymerization occurs in the presence of a chain transfer agent.

15. The process of claim 9 wherein the chain transfer agent is selected from the group consisting of dodecanethiol, bromotrichloromethane, 2-butanol, 1-butanol, allyl alcohol, 2-mercaptoethanol and octadecyl mercaptan.

16. The process of claim 9 wherein the concentration of chain transfer agent is from about 0.1 weight percent to about 10 weight percent based on the weight of the monomer.

* * * * *